Inventor:
ROBERT L. ADAMS
By John T. O'Halloran
Attorney

Invntor:
ROBERT L. ADAMS
By John T. O'Halloran
Attorney

United States Patent Office 3,432,035

Patented Mar. 11, 1969

3,432,035

DOCUMENT HANDLING APPARATUS

Robert L. Adams, Haddonfield, N.J., assignor to Radio Corporation of America, a corporation of Delaware Filed Dec. 13, 1966, Ser. No. 601,397
U.S. Cl. 209—74 9 Claims
Int. Cl. B07c *1/00, 3/00;* G08b *21/00*

ABSTRACT OF THE DISCLOSURE

Document tracking apparatus that tracks a plurality of documents simultaneously traversing a transport path. The apparatus keeps a running count of the number of documents in the transport path and positions selector signals, which determine the destination of each document, in locations of a selector signal storage circuit that correspond to the count. As each document leaves the transport path, the appropriate selector signal is extracted from the storage circuit to determine the destination of the document.

Figure 1:
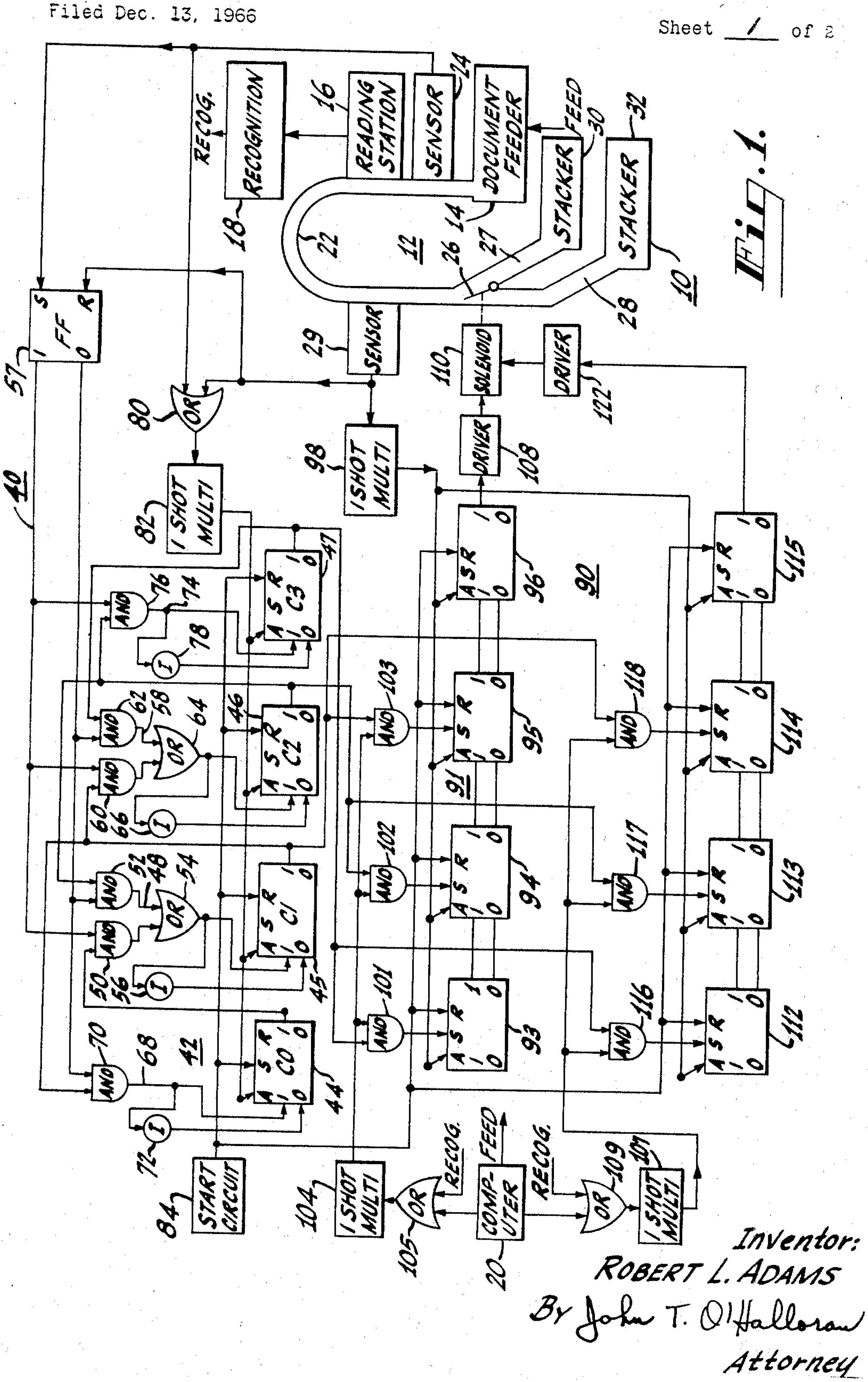

Document readers, such as card readers, character readers, and the like, normally operate in either a demand feed or a synchronous feed mode. In demand feed, each document is fed to a read station by individually received command signals. In synchronous feed, the documents are fed automatically to the read station once the reader is started. After being read, each document is transported to accept, reject, or other output stackers, depending upon what data has been read from the document.

Document readers are normally designed to handle only one size of document. If attempts are made to read documents of different sizes, then timing problems and document confusion can result. For example, in synchronous feed document readers, timing problems arise because the timing pulses may occur too soon for long documents and too late for short documents. Consequently, incorrect gating of documents to the output stackers can occur for the long documents; whereas inefficient use of the reader occurs for the short documents. In demand feed document readers, document confusion can occur if short documents are read because a plurality of documents may be present simultaneously in the transport path between the read station and the output stackers. If the appropriate selector signal does not track or coincide with the correct document at the selector gate that controls the entrance to the stackers, then incorrect gating can occur.

Accordingly, it is an object of the present invention to provide new and improved document handling apparatus.

It is another object of this invention to provide document handling apparatus that renders a document reader capable of handling documents of different sizes without confusion.

It is a further object of this invention to provide document handling apparatus that simultaneously tracks a plurality of documents without confusion arising.

Apparatus embodying the invention is rendered capable of handling objects, such as documents, of various sizes by incorporating therein a tracking circuit. The tracking circuit accurately tracks one or a plurality of objects in a predetermined path so that each object is directed to its correct destination at the end of the predetermined path by an appropriate selector signal. Consequently, in document readers, documents of various sizes can be read without confusing the documents. Furthermore the documents can be fed either on demand or synchronously.

Figure 2:
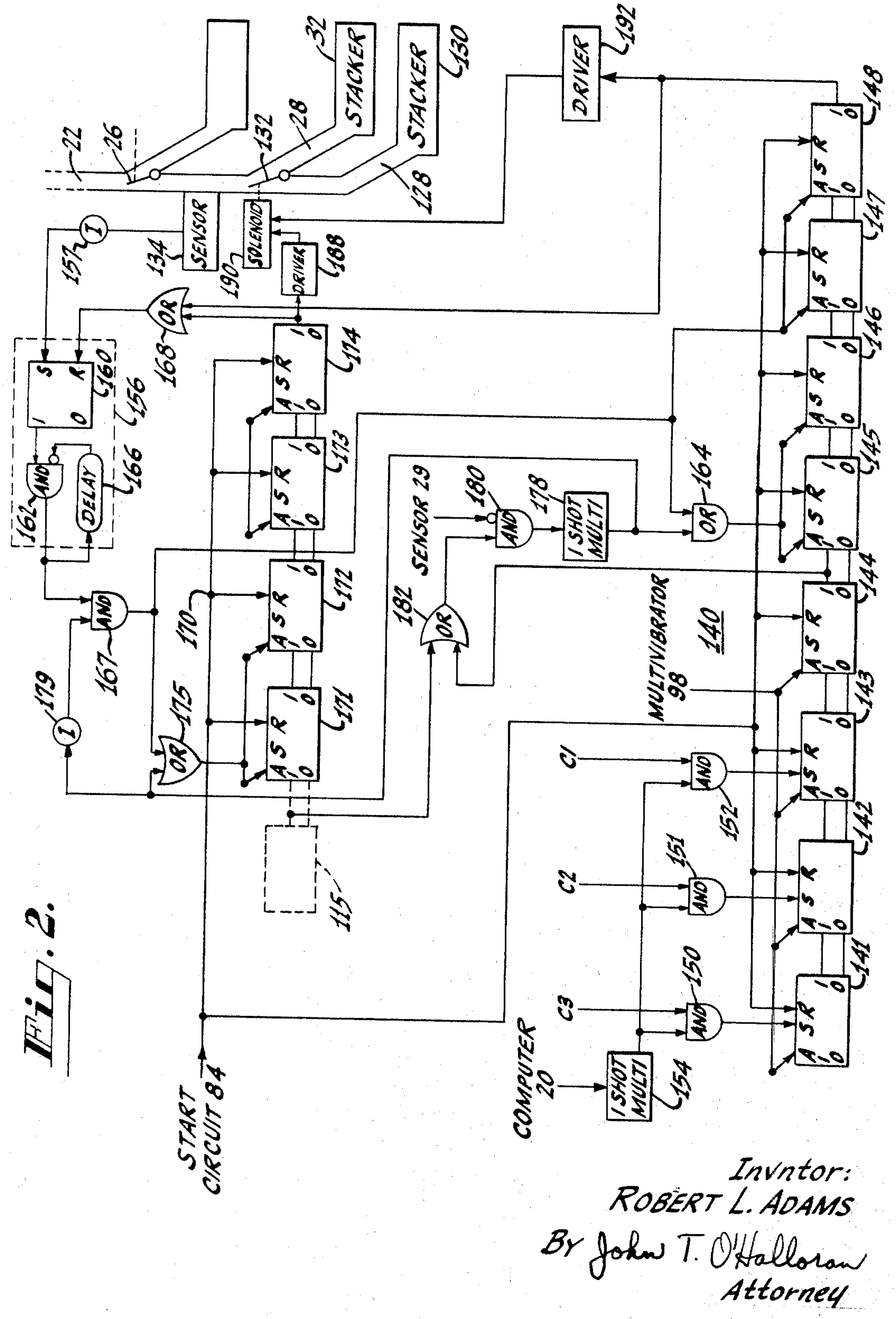

In the drawing:

FIGURE 1 is a schematic block diagram of a document reader embodying the invention, and FIGURE 2 is a schematic block diagram of another embodiment of the invention.

Referring now to FIGURE 1, document handling apparatus 10 includes a document reader 12 having a document feeder mechanism 14 for feeding a plurality of documents to be read by a reading station 16. It is assumed, throughout the specification, that the reader 12 includes a document feeder and transport mechanism such as that disclosed in Patent No, 3,227,441, Document Handling Apparatus, by C. G. Fraidenburgh et al., and assigned to the same assignee as the present invention. Such a document feeder and transport mechanism may for example, be utilized with a card reader, a character reader or the like.

It is also assumed throughout the specification that the document reader 12 is a character reader and consequently the reading station 16 includes character recognition logic 18, that may, for example, be similar to that described in the copending application, Character Recognition System Utilizing Asynchronous Zoning Characters, for S. Klein et al., filed Jan. 25, 1963, Ser. No. 253,911, now Patent No. 3,293,604, and assigned to the same assignee as the present invention.

The documents in the document feeder 14 may be of any one of a plurality of sizes and they may be fed on demand or automatically to the read station 16. Throughout the specification, it is assumed that the documents are fed on demand and, consequently, a feed signal is applied to the document feeder 14 from a computer 20 before each document is fed to a transport path 22. The presence of each document fed by the document feeder 14 into the predetermined transport path 22 is sensed by a first document sensor 24 to provide a sense signal denoting that a document has entered the path 22. The sensor 24 may for example comprise a photodiode. Each document entering the transport path 22 is conveyed past the reading station 16 where the data contained on the document is read. The document is then conveyed further along the transport path 22 until the document reaches a control gate 26. The control gate 26 determines which of the branches 27 or 28 each document takes. Mounted in the predetermined path 22 just prior to the control gate 26 is a second document sensor 29 that provides a second sense signal denoting that a document is about to leave the path 22. The branches 27 and 28 are terminated by output stackers 30 and 32 respectively. Each document is conveyed past the control gate 26 to one or the other of output stackers 30 and 32.

During the time that a document is first detected entering the path 22 by the first sensor 24 until the time that the document is detected leaving the path 22 by the second sensor 29, a tracker circuit 40 accurately tracks documents or other objects in the path 22. The tracker circuit 40 includes an add-subtract counter 42. The counter 42 may, for example, be of the shift register type and include four bistable circuits 44, 45, 46, and 47. The bistable circuits comprise stages C0, C1, C2, and C3, and each stage includes an advance terminal (A), a set terminal (S), and a reset terminal (R). When a bistable circuit is operating in one of its stable states, say set, a binary number 1 is stored in the stage, whereas the circuit stores a binary number 0 when operating in its reset stable state. A pair of input terminals (1) and (0) as well as a pair of corresponding output terminals (1) and (0) denote these operating states. The 1 output terminal of each stage of the shift register counter 42 is coupled to the 1 and 0 input terminals of the succeeding shift register counter stages as well as to the 1 and 0 input terminals of the preceding counter stage through interstage coupling networks. The interstage coupling networks cause the shift register 42 to operate in known fashion in the manner of an up-down counter. Thus the first stage 44 has its 1 output terminal coupled through the interstage coupling network 48 to the second stage 45. The coupling network 48 includes a pair of AND gates 50 and 52 having their outputs coupled through an OR gate 54 to the 1 input terminal of the stage 45 as well as through an inverter 56 to the 0 input terminal of this stage.

The AND gate 50 functions as an add gate and consequently a signal from the 1 output terminal of the first bistable circuit 44 is coupled thereto. The AND gate 52 functions as a subtract gate and consequently the 1 output terminal of the third stage 46 is coupled thereto. Add and subtract signals are derived from the first and second sensors 24 and 29 by applying the first and second sense signals to the set (S) and reset (R) terminals respectively of an add-subtract flip-flop 57. The 1 output terminal of the flip-flop 57 produces an add signal whereas the 0 output terminal produces a subtract signal. The add and subtract signals are applied to the AND gates 50 and 52 respectively.

The second stage 45 is coupled through the interstage coupling network 58 to the third stage 46. The network 58 includes an add AND gate 60 as well as a subtract AND gate 62, both of which are coupled through an OR gate 64 to the 1 input terminal of the counter stage 46 as well as through an inverter 66 to the 0 input terminal of this stage. The second stage 45 is also coupled to the preceding stage through the interstage coupling network 68. The coupling network 68 only includes a subtract AND gate 70 because there is no stage preceding the first stage 44. The output of the AND gate 70 is coupled directly to the 1 input terminal of the stage 44 as well as through an inverter 72 to 0 input terminal of this stage.

The stage 46 is also coupled to the next succeeding and last stage 47 through the interstage coupling network 74. Since the stage 47 is the last stage the coupling network 74 only includes an add AND gate 76. The gate 76 has its output coupled directly to the 1 input terminal of the stage 47 as well as through the inverter 78 to the 0 input terminal of this stage.

Each of the add gates 50, 60, and 76 couples the output of one stage of the counter 42 to the input of the next succeeding stage whereas each of the subtract gates 70, 52, and 62 couple the output of one stage to the input of the preceding stage. An add signal is derived from the setting of the flip-flop 57 by the first sensor 24 whereas a subtract signal is derived from the resetting of the flip-flop 57 by the second sensor 29. The first and second sense signals from the sensors 24 and 29 are also applied through an OR gate 80 to trigger a one-shot multivibrator 82 that provides the advance or shift signal that is applied to each of the advance terminals A of the stages in the shift register counter 42. The counter 42 is initially set to store the number 1000 by coupling a start circuit 84 to the set terminal of the first stage 44 and to the reset terminal of the stages 45, 46, and 47. The register 42 functions as an up-down counter that adds each of the documents entering the path 22 and subtracts each of the documents leaving this path. Thus the counter 42 counts the number of documents simultaneously present in the path 22. Since there are 3 succeeding stages coupled to the first stage 44, the shift register 42 can count up to 3 documents in the path 22. The number of documents that can be counted by the shift register 42 can be increased merely by adding more stages and intercoupling networks. Each such added stage permits the number of documents counted in the path 22 to be increased by 1. The register 42 counts the number of documents in the path 22 by shifting the 1 initially stored in the stage 44 to a succeeding stage each time a new document is sensed by the first sensor 24 and then shifting the 1 back to a preceding stage each time the second sensor 29 detects that a document is leaving the path 22.

The selector signals derived from either the computer 20 or the recognition logic 18 determines the branch and the output stacker that the documents in the path 22 take. The stackers 30 and 32 may for example comprise accept and reject stackers respectively. The computer 20 may generate a selector signal at any time from right after a document is read until the document arrives at the sensor 29 or until the next document arrives at the reading station 16. These differences in time preclude the provision of a fixed time delay storage circuit for the selector signals, such as a delay line. Consequently, a selector signal storage circuit 90 comprises a shift register having first and second levels 91 and 92 respectively. The first level register 91 may for example store accept selector signals whereas the second lever 42 may store reject selector signals.

The first level shift register 91 includes four stages 93, 94, 95, and 96 serially coupled to each other. Each stage in the first level register 91 is initially reset by the start circuit 84. The advance terminal A of each stage of the register 91 receives an advance signal from a one-shot multivibrator 98 that is triggered to fire from the second sense signal derived from the second document sensor 29. The stages in the register 91 are coupled to corresponding stages in the counter register 42 by means of interstage coupling AND gates 101, 102, and 103. Each of the AND gates 101 through 103 receives an accept signal derived from a one-shot multivibrator 104 that is triggered to fire by either accept signals from the computer 20 or an accept signal from the recognition logic 18 as applied through an OR gate 105. The counter stage 47 is coupled through the AND gate 101 to the set terminal of the shift register stage 93 whereas the counter stage 46 is coupled to the same terminal of the register stage 94 through the gate 102. Similarly, the counter stage 45 is coupled through the gate 103 to the register stage 95. Thus the count in the counter 42 may be transferred to the register 94 through the gates 101, 102, and 103. The output stage of the shift register 96 provides the drive signal that is coupled to a driver amplifer 108. The driver 108 in turn activates a push-pull solenoid 110, that control the positioning of the control gate 25 to connect the path 22 to the branch 27 and therefore to accept station 30.

The second level shift register stage 92 also includes four stages 112, 113, 114, and 115 serially coupled to each other as well as through AND gates 116, 117, and 118 to the counter stages 45, 46, and 47, similar to the first level register 91. Each stage 113–115 is initially cleared by a reset pulse derived from the starter circuit 84. The gates 116, 117, and 118 are activated by a reject selector signal derived from a one-shot multivibrator 107. The multivibrator 107 is triggered to fire by a reject signal from the computer 20 or the recognition logic circuit 18, as derived from an OR gate 109. Each stage of the register 92 is advanced by a shift signal from the multivibrator 98 and the output stage 115 is coupled to a driver amplifier 122. The driver amplifier 122 is in turn coupled to the solenoid 110. When the driver 122 is energized the solenoid 110 is activated to control the gate 26 to connect the path 22 to the second branch 28 and consequently to the reject stacker 32.

In describing the operation of the document handling apparatus it will be assumed that the documents in the document feeder 14 are of a size that permits three of them to travel down the transport path 22 simultaneously but consecutively. Initially the starter circuit 84 sets a binary 1 in the stage 44 of the counter 42 and resets the remaining stages in this counter as well as all the stages in the first and second level registers 91 and 92. As the first document is picked up by the document feeder 14 on command from a feed signal and transported down the path 22, the first document sensor 24 detects the document and sets the flip-flop 57. The output signal from "1" output terminal of the flip-flop 57 activates the AND gate 50 since this gate had been previously enabled by the 1 stored in the counter stage 44. The activation of the AND gate 50 applies a signal to the 1 input terminal of the register stage 45 through the OR gate 54. This input signal is advanced into the stage 45 by an advance pulse derived from the one-shot multivibrator 82, which is triggered to fire by the first sense signal from the sensor 24. This document is read by the reading station 16 and the information thereon is recognized in the recognition circuit 18. If the recognition circuit 18 signals the successful reading of this document to the computer 20, the computer 20 sends a feed signal to the document feeder to cause the document feeder 14 to insert a second document into the transport path 22. The computer 20 also sends an accept signal to the multivibrator 104. The AND gate 103 is therefore activated and the first level or accept register stage 95 is set.

The storing of the 1 in the counter stage 45 applies a signal to the AND gate 60 in the interstage coupling network 58 to activate this gate since the flip-flop 57 remains set. When the second document is detected by the sensor 24, the advance pulse generated in the multivibrator 82 advances the 1 from the counter stage 45 into the counter stage 46. Thus the second document is tracked in the path 22 along with the first document. It is assumed that the computer 20 decides to reject the second document after it is read by the reading station 16. The reject signal triggers the multivibrator 107 thus activating the AND gate 117 to set the shift register stage 113 in the second level register 92.

The computer 20 sends another feed signal to the document feeder 13 to feed the third document into the transport path 22 while the first two documents are still in this path. The third document causes the 1 stored in the counter stage 46 to be shifted into the stage 47 of this counter. Assuming this document is acceptable, the 1 stored in the stage 47 is utilized to set the register stage 93 in the register 91. Consequently, while the three documents are traversing the transport path 22, the registers 91 and 92 store the selector signals to determine the branches these documents are to take at the end of the path 22.

When the first document is detected by the second document sensor 29, an advance pulse is derived from the one-shot multivibrator 98 to shift the selector signal (i.e., 10) from the stages 95 and 114 of the selector signal storage circuit 90 into the output stages 96 and 115 of this circuit. The driver amplifier 108 is thereby activated to cause the solenoid 110 to pull the control gate 26 to steer the first document into the branch 27 and the accept stacker 30. Simultaneously the flip-flop 57 is reset to activate the substract AND gate 62 to cause the 1 stored in the counter stage 47 to be fed back to the counter stage 46. Thus two documents are now counted as present in the transport path 22. It is assumed for simplicity that no more documents are fed into the path 22. The second document is then sensed by the sensor 29 which shifts the selector signal (i.e., 0 1) from the stages 95 and 114 into the output stages 96 and 115. The driver 122 is therefore activated to cause the solenoid 110 to push the control gate 26 and thereby steer the second document into the second branch 28 and the reject stacker 32. A subtract signal is also derived from the second sensor 26 to cycle the 1 in the counter stage 46 back to counter stage 45. The third document is then steered into the first branch 27 and the accept stacker 30 in a manner similar to the first document. The 1 in the counter stage 45 is recycled back to the standby stage 44. Thus three documents have been successfully tracked by the tracking circuit 40.

The document handling apparatus is capable of tracking more documents by adding more stages to the counter 42 and registers 91 and 92.

In FIGURE 2 there is shown a second embodiment of the invention that renders the document reader capable of transporting documents into additional branches and stackers added onto the transport path 22.

A third branch 128 having a document stacker 130 terminating the branch is added onto the transport path 22 along with a second control gate 132 that steers documents into either the branch 28 or the branch 128. Additionally a third document sensor 134 is added onto the transport path 22. The extension of the capability of the document reader to provide three different branchings also requires a third level shift register 140 for the selector signal storage circuit 90. The third level register 140 includes a plurality of stages 141 through 148 and is divided into first and second segments. The first three stages of the first segment, i.e., stages 141, 142, and 143 are coupled to counter stages C3, C2, and C1 (i.e., stages 47, 46, and 45 respectively) of the counter 42 by means of AND gates 150, 151, and 152. A selector signal derived from a one-shot multivibrator 154 comprises the other input to the gates 150, 151, and 152. The first segment of the third level register 140 (i.e., stages 141, 142, 143, and 144) is advanced by the advance pulses derived from the multivibrator 98, which is fired by the second document sensor 29.

The second segment of the shift register 140 (i.e., stages 145, 146, 147, and 148) is advanced by advance pulses derived from a pulse generator circuit 156 that is activated by the absence of the detection of a document by the third document sensor 134. The pulse generator 156 includes an input flip-flop 160 that is set by a signal derived from an inverter 157. The inverter 157 is coupled to the third sensor 134 to provide a signal at any time a document is absent from the sensor 134. The 1 output of the flip-flop 160 is coupled to one input of an AND gate 162. The output of the AND gate 162 is fed back through a delay circuit 166 to an inhibit input terminal of the AND gate 162. The pulse output of the generator 156 is applied through an AND gate 167 to the stages 147 and 148 of the register 140. The pulse output of the AND gate 167 is applied through an OR gate 164 to the stages 145 and 146 of the register 140.

When the flip-flop 160 is set, an output signal is produced from the AND gate 162 because an inhibit input is absent. The output pulse is then fed back through the delay circuit 166 to inhibit the gate 162 and turn it off. The delay circuit 166 delays the turning on of the AND gate 162 again. A series of output pulses are therefore produced from the pulse generator 156 until the flip-flop 160 is reset by a signal derived from an OR gate 168. The pulse generator 156 produces pulses continuously when a document is not present at the sensor 134.

The document handling apparatus 40 also requires the addition of the second portion 170 to the second level shift register 92. The second portion 170 comprises four stages, 171, 172, 173, and 174 that are coupled in tandem from the output stages 96 of the register 92. The second portion 170 is advanced by advance pulses derived from the pulse generator 156 and applied directly to the last two stages 173 and 174 as well as through an OR gate 175 to the first two stages 171 and 172 of this register. The other pulse input to each of the OR gates 164 and 175 is derived from a one-shot multivibrator 178 that is triggered by an AND gate 180. The AND gate 180 is enabled by the absence of a signal from the second sensor 29. The AND gate 180 is activated by an OR gate 182 that couples signals from either the shift register stage 144 of the third level register 140 or the stage 115 of the second level register 92. The output of the multivibrator 178 is inverted in an inverter 179 to comprise the second input to the AND gate 167. Thus an advance pulse generated in the multivibrator 178 takes precedence over an advance pulse from the pulse generator 156.

The output of the last stage 174 of the second portion 170 of the second level register 92 is coupled to a driver amplifier 188 that activates a solenoid 190. The solenoid 190 when activated pulls the control gate 132 to connect the transport path 22 to the branch 28. Similarly, the output stage of the register 140 is coupled to a driver 192 that activates the solenoid 190 to push the control gate 132 and connect the path 22 to the third branch 128.

In describing the operation of the embodiment shown in FIGURE 2, it will be assumed for simplicity that only a single document is being conveyed down the transport path 22. When the first document sensor 24 (FIGURE 1) detects the presence of this document in the path 22, the binary "1" stored in the register stage 44 is transferred to the stage 45 of the counter register 42. When the document is read and the computer 20 determines that the document should be conveyed to the third branch 128 and the third stacker 130, the computer 20 activates the one-shot multivibrator 154 to cause a "1" to be entered into the stage 143 of the third level register 140. When the second document sensor 29 detects the presence of the document, an advance pulse is generated in the one-shot multivibrator 98 that shifts the "1" into the stage 144 of the third level register 140. Simultaneously, the "1" is fed back to the first stage 44 of the register counter 42 to prepare for another document.

The document bypasses the first branch 27 because the control gate 26 is normally spring biased, in the embodiment of FIGURE 2 to connect the path 22 to the branches 28 and 128. At the end of the pulse from the multivibrator 98, the AND gate is activated by the presence of a 1 in a register stage 144 to provide an advance pulse to shift the one to the stage 145. The output of the multivibrator 178 is inverted in the inverter 179 to disable the AND gate 167. The flip-flop 160 is initially set by the absence of a third sense signal in the sensor 134 and causes the pulse generator 156 to generate a plurality of pulses. The binary "1" is shifted into the stage 146 when the AND gate 167 is activated at the end of the pulse output of the multivibrator 178. The 1 is then shifted by the pulse generator 156 until it appears in the output stage 148. The document is then sensed by the third sensor 134 and the inversion of the third sense signal by inverter 157 removes the hold from the flip-flop 160. The presence of the 1 in the output stage 148 then resets the flip-flop 160 and turns off the pulse generator 156. The stage 148 also provides a signal for the driver 192. The driver 192 activates the solenoid 190 to push the control gate 132 to connect the branch 128 to the transport path 22 and causes the document to be fed to the stacker 130.

A document reader embodying the invention is rendered capable of reading documents of any one of a variety of sizes and shapes. The document reader tracks documents during the time they are being conveyed to output branches and causes the proper selector signal to coincide with the proper document to steer the documents into correct branches. The document handling apparatus can be enlarged to provide a plurality of output branches by adding more levels to the tracking apparatus.

What is claimed:

1. Apparatus for tracking one or more objects entering a predetermined path and continuing in said predetermined path until a selector signal designates which branch of a plurality of branches connected to said predetermined path, each object is to take, comprising the combination of, gating means coupled to said predetermined path to be activated by said selector signals to control the branch each of said objects is to take, counting means for upcounting when an object enters said path and downcounting when an object leaves said path so as to provide a count of the number of objects simultaneously traversing said path, means providing in succession a selector signal for each object traversing said path, with each selector signal being provided at any time during such traversing, a selector signal storage circuit having a plurality of storage locations for storing said selector signals, means actuated by said counting means for coupling each selector signal into a location in said storage circuit corresponding to the count of objects in said counting means, and means for applying each selector signal to actuate said gating means upon a downcount occurring in said counting means so as to steer the object being downcounted to the correct branch.

2. Apparatus in accordance with claim 1 wherein said selector signal storage circuit comprises a shift register.

3. Apparatus in accordance with claim 2 wherein said shift register includes a plurality of levels, one for each of said branches connected to said predetermined path.

4. Apparatus in accordance with claim 2 wherein said objects comprise documents to be read.

5. Apparatus in accordance with claim 4 that further includes a reading station for reading data from a document, and means coupled to said reading station for generating a selector signal for said document.

6. Apparatus in accordance with claim 5 wherein said counting means comprises, an add-subtract counter for adding each document entering said predetermined path and subtracting each document as it leaves said predetermined path for providing a count of the documents in said predetermined path.

7. Apparatus in accordance with claim 6 wherein said add-subtract counter comprises a shift register having a plurality of stages with each having an input network and an output network, and an intercoupling network for intercoupling the stages of said register.

8. Apparatus in accordance with claim 7 wherein said intercoupling network includes an add gate for coupling an output network of one stage of said register to the input network of the succeeding stage to up count in said register, and a subtract gate for coupling an output network of one stage of said register to the input network of the preceding stage of said register to down count in said register.

9. Apparatus in accordance with claim 8 that further includes a first sensor mounted to detect a document entering said predetermined path to produce a first sense signal, a second sensor mounted to detect a document leaving said predetermined path to produce a second sense signal, and means coupling said first and second sense signals to said add and subtract gates respectively to up count when a document enters said predetermined path and to down count when a document leaves said predetermined path.

References Cited

UNITED STATES PATENTS

| | | | |
|---|---|---|---|
| 3,141,540 | 7/1964 | Burkhardt | 209—74 X |
| 3,188,619 | 6/1965 | Hemphill et al. | 340—259 |
| 3,219,992 | 11/1965 | Stuchbery et al. | 340—259 |
| 3,343,672 | 9/1967 | De Vries et al. | 209—74 |
| 3,352,417 | 11/1967 | Cutaia | 209—74 |

ALLEN N. KNOWLES, *Primary Examiner.*

U.S. Cl. X.R.

340—259